Aug. 24, 1926.

W. E. SYKES 1,597,636

MEASURING INSTRUMENT FOR GEAR WHEEL TEETH

Filed August 9, 1921   3 Sheets-Sheet 1

Inventor
William E. Sykes
by Wilkinson & Fiesta
Attorneys.

Aug. 24, 1926.
W. E. SYKES
1,597,636
MEASURING INSTRUMENT FOR GEAR WHEEL TEETH
Filed August 9, 1921  3 Sheets-Sheet 2
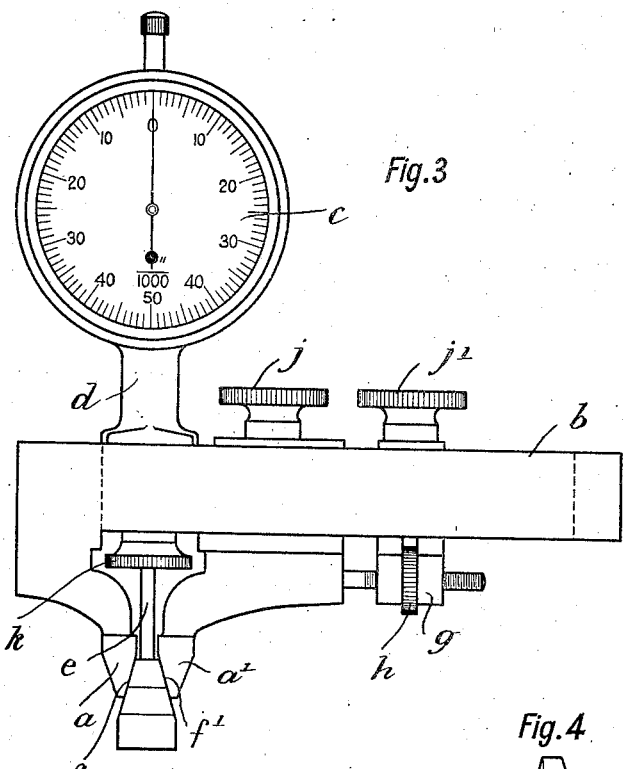
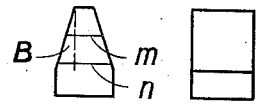
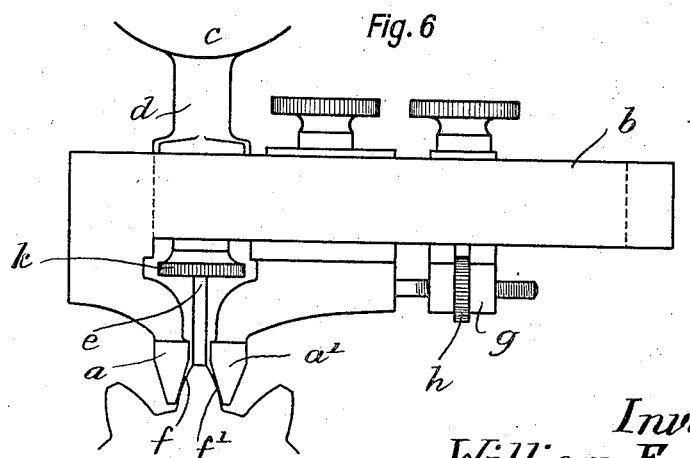
Inventor
William E. Sykes
by Wilkinson & Giusta
Attorneys.

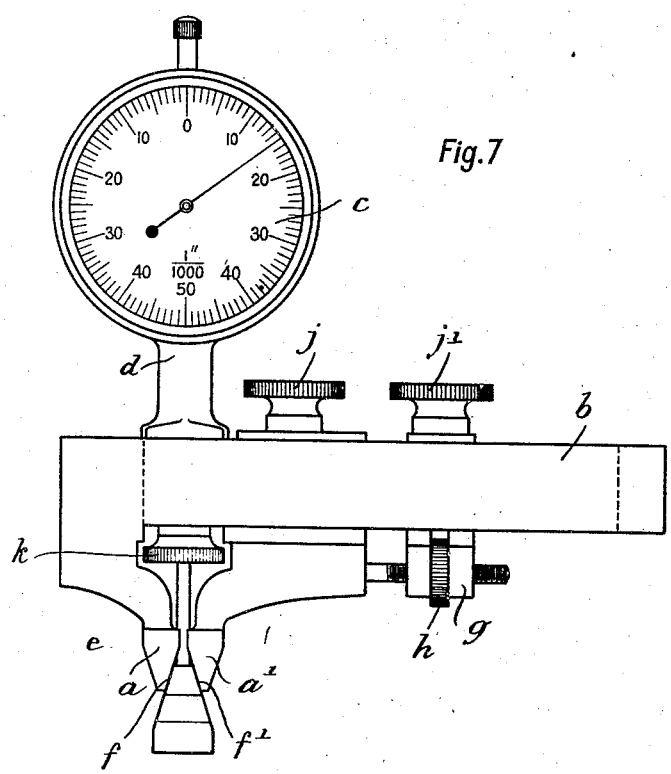

Patented Aug. 24, 1926.

1,597,636

UNITED STATES PATENT OFFICE.

WILLIAM EDWIN SYKES, OF SLOUGH, ENGLAND.

MEASURING INSTRUMENT FOR GEAR-WHEEL TEETH.

Application filed August 9, 1921, Serial No. 490,978, and in Great Britain September 20, 1920.

For measuring the thickness of gear wheel teeth instruments having a vernier scale are generally used, but in certain classes of precision work more precise readings are required. The object of the present invention is to provide an instrument whereby more precise measurements may be made with equal or greater facility than is possible by means of a vernier gauge.

According to the present invention I provide a form of caliper gauge consisting of a beam on which are mounted two jaws. One or both jaws is or are arranged slidable and adjustable in such a manner that the distance of the inside faces may be varied to suit teeth of various pitches. The inside faces of the said jaws are arranged at an angle to each other.

I further mount on the aforementioned beam a test indicator which may be of any known or convenient form, but I prefer to employ the type having a circular dial known as a dial test indicator. The test indicator is mounted on the beam in a manner that the plunger or contact spindle may operate between the inside angular faces of the jaws, and by this arrangement the contact point of the indicator is adapted to make contact with the top of the tooth being measured when the inside angular faces of the jaws make contact with the sides or flanks of the same tooth.

In order to obtain measurements with the instrument made as already described it is necessary to provide means whereby the zero position of the test indicator may be adjusted relative to the width apart of the jaws or alternatively means whereby the width apart of the jaws may be adjusted relative to the test indicator. To accomplish this I preferably arrange one jaw slidable on the beam and adjustable by means of a nut turning on a fine pitch screw. To obtain definite and precise settings of the instrument I preferably employ gauge blocks each representing a rack tooth of any particular pitch.

The invention will be further described with reference to the accompanying drawings wherein Fig. 1 is a front elevation of the instrument.

Fig. 2 an end elevation.

Fig. 3 corresponds to Fig. 1 excepting that a gauge block is shown in position between the jaws of the instrument.

Fig. 4 is an end elevation of a gauge block.

Fig. 5 is a side elevation of the gauge block.

Fig. 6 shows the instrument applied to a gear wheel tooth.

Fig. 7 corresponds to Fig. 3 except that the jaws are set to measure teeth of a smaller size than those corresponding to the gauge block.

Figure 1:
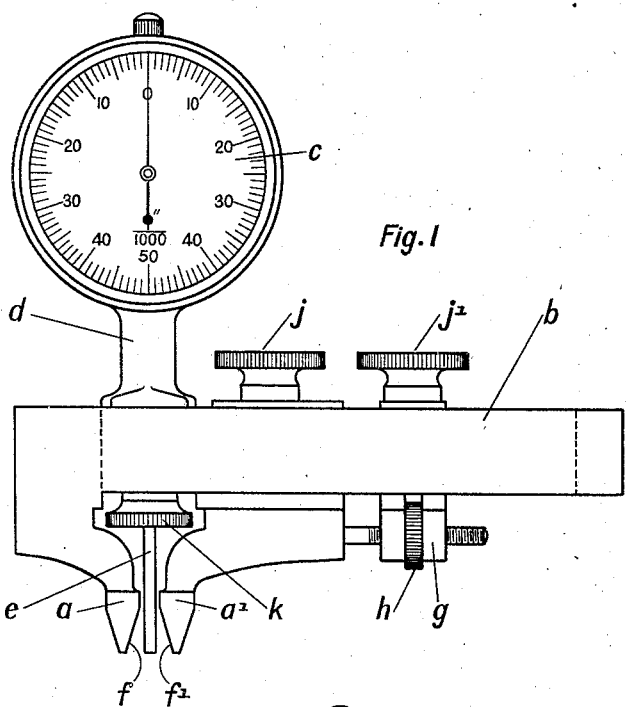
Figure 2:
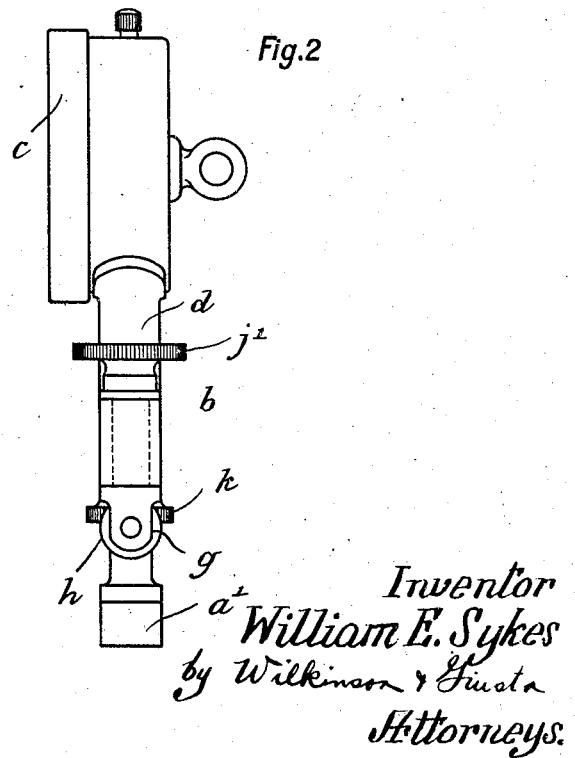

In Figs. 1 and 2 the jaws are shown at $a$ and $a^1$. The jaw $a$ is shown rigidly attached to the beam $b$ and the jaw $a^1$ is slidably attached to the beam. The dial test indicator $c$ is mounted on the holder $d$ which is slidably mounted in the slot formed in the beam $b$. The plunger $e$ of the dial test indicator is arranged to pass through the holder $d$ in a manner that its contact point is placed between the inside faces of the jaws $a$ and $a^1$. The inside faces $f$ and $f^1$ of the said jaws are arranged at an angle to each other, as shown in the drawings. This angle is made to correspond to the pressure angle of the gear tooth to be measured. As nearly all gears are made to the standard pressure angle of $14\frac{1}{2}°$ the provision of means for adjusting this angle is considered unnecessary. For other pressure angles instruments with jaws of a corresponding angle may be used. Attached to jaw $a^1$ is a screw which passes through the adjustably mounted forked holder $g$. The nut $h$ is mounted between the forked projections on the holder $g$ in a manner that it may be used to make minute adjustments of the slidably mounted jaw $a^1$. $j$ and $j^1$ are locking nuts, the former for locking the slidably mounted jaw $a^1$ and the latter for locking the holder $g$. The knurled nut $k$ serves to lock the dial test indicator holder in a suitable position on the beam $b$. In Figs. 4 and 5 is shown a master gauge block. This gauge block may represent a rack tooth of the involute system. It may be of any desired pitch or thickness, but the angle B should correspond to the angle of the jaws $a$ and $a^1$. On one end of the gauge block is engraved the pitch line $m$ and also the working depth line $n$.

It is well-known that in the involute system of tooth gearing the theoretical rack tooth has straight sides and that any gear wheel, irrespective of the number of teeth, will gear correctly with a rack of the same pitch and pressure angle. The instrument forming the subject matter of this invention is based on this principle. Fig 3 shows the instrument applied to a gauge block which, as already explained, represents a rack tooth. Fig. 6 shows the instrument applied to a wheel tooth which corresponds in pitch and pressure angle to the gauge block. In applying the instrument as already described with reference to Figs. 3 and 6 the instrument is used as a comparator. Its action depends on the use of the master gauge block in conjunction with the test indicator and the jaws and other essential parts of the instrument, thus providing means of precisely comparing gear wheel teeth with a gauge block. According to this method of applying the instrument a gauge block will be required for each different size tooth to be measured, but a further method, yet to be described, can be used whereby one gauge block only is required for a range of pitches or tooth sizes.

In a series of gauge blocks made in accordance with this invention the angles are the same and therefore the only essential difference is the width at the top where the plunger of the test indicator makes contact. By setting the jaws of the instrument as shown in Fig. 3 and adjusting the dial of the test indicator to read zero a definite and known width apart of the jaws is obtained providing the width of the master block is known. Providing means are available for measuring the further adjustment of the jaws the instrument may be set to measure other sizes of teeth. The dial indicator itself may be used to measure the relative movement of the jaws. By adjusting the slidable jaw by the means provided, and as already described, and at the same time holding a master gauge block in position between the jaws, the amount of movement of one jaw relative to the other will be registered by reason of the action of the gauge block on the inclined faces of the jaws in conjunction with the action of the top of the gauge block in contact with the plunger of the instrument. The movement of the plunger of the instrument will have relation to the movement of the jaws as set forth by the following equation:

$$\text{Movement of plunger} = \text{movement of jaw} \times \frac{\cot B}{2}$$

Therefore, any particular size of gauge block may be used for measuring a variety of sizes of teeth. The range of sizes which may be measured by any particular block will depend upon the range of movement of the test indicator plunger and the particular size of the gauge block used. Fig. 3 represents a master gauge block in position between the jaws of the instrument and the instrument so adjusted that it is suitable for measuring a pitch corresponding to the gauge block. Fig. 7 shows the same master gauge block in position and the instrument so adjusted that it will measure a smaller pitch.

I do not bind myself to the details of construction shown in the drawings. Various modifications may be made without departing from the scope and spirit of my invention. For instance, in place of the dial test indicator shown in the drawings any other suitable type of testing or measuring instrument having an amplifying mechanism may be used. Both jaws may be slidably mounted. A different construction of frame may be employed; for instance, a frame adapted to carry in addition to the jaws, an amplifying mechanism and also an extension or addition adapted to carry the wheel to be tested.

Having thus described the nature of the said invention and the best means I know of carrying the same into practical effect, I claim:—

1. A gear tooth measuring instrument comprising in combination a beam, a fixed jaw on the beam, a movable jaw slidably mounted on the beam, said jaws having work engaging faces inclined to one another at an angle corresponding to the pressure angle of a gear tooth to be measured, said faces arranged to have tangential bearing respectively on opposite sides of a tooth to be measured, means for moving the movable jaw minute distances lengthwise of the beam, means for clamping the movable jaw in any adjusted position, a plunger-operated test indicator mounted on the beam, and means for adjustably securing the indicator to the beam in position relatively to the jaws when adjusted to dispose the plunger between the jaws.

2. A gear tooth measuring instrument comprising a beam, fixed and movable jaws carried thereby having their opposed faces inclined at an angle corresponding to the pressure angle of a gear tooth to be measured, means for moving the movable jaw towards or away from the fixed jaw, and a plunger operated test indicator longitudinally adjustable on the beam whereby it may be disposed between the jaws when the latter are in operative position.

In testimony whereof I have signed my name to this specification.

WILLIAM EDWIN SYKES.